United States Patent [19]
Batt

[11] Patent Number: 5,102,376
[45] Date of Patent: Apr. 7, 1992

[54] PUMP CONTROLLED AUTOMATIC TRANSMISSION

[76] Inventor: Bernard E. Batt, 12850 State Rd. 84 8-6, Fort Lauderdale, Fla. 33325

[21] Appl. No.: 743,759

[22] Filed: Aug. 12, 1991

[51] Int. Cl.$^5$ .............................................. F16H 3/74
[52] U.S. Cl. ...................................... 475/72; 475/93; 475/900
[58] Field of Search ................... 475/72, 73, 78, 80, 475/83, 91, 93, 102, 106, 107, 900

[56] References Cited

U.S. PATENT DOCUMENTS

| | | | |
|---|---|---|---|
| 2,890,604 | 6/1959 | Campbell | 475/102 X |
| 3,796,111 | 3/1974 | Schauer | 475/79 |
| 3,969,957 | 7/1976 | DeLalio | 475/79 |
| 4,164,156 | 8/1979 | Reed | 475/81 |
| 4,183,264 | 1/1980 | Reed | 475/81 |
| 4,368,653 | 1/1983 | Mizuno et al. | 74/868 |
| 4,776,233 | 10/1988 | Kita et al. | 475/76 |
| 4,941,371 | 7/1990 | Koyama et al. | 74/865 |

FOREIGN PATENT DOCUMENTS

| | | | |
|---|---|---|---|
| 58-102849 | 6/1983 | Japan | 475/72 |
| 60-30847 | 2/1985 | Japan | 475/72 |
| 1097848 | 6/1984 | U.S.S.R. | 475/72 |

Primary Examiner—Richard Lorence
Assistant Examiner—William O. Trousdell
Attorney, Agent, or Firm—Oltman and Flynn

[57] ABSTRACT

A hydromechanical transmission includes a first shaft having a drive source end and a transmission end which receives torque from a drive source, a planet gear mounting structure joined to the transmission end of the first shaft, at least one planet gear rotatably mounted on the planet gear mounting structure, a ring gear surrounding and meshing with the at least one planet gear and joined by a connecting structure to a second shaft to which the transmission delivers torque, an annular sun gear slidably surrounding the transmission end of the first shaft and meshing with the at least one planet gear, a first pump having a pump operating shaft, the pump operating shaft being joined to the sun gear through gears, fluid to pump through the first pump, a valve for controlling the flow of fluid out of the first pump. A second pump and second planet gear assembly provide reverse drive, and provision is also made for neutral and park modes.

14 Claims, 2 Drawing Sheets

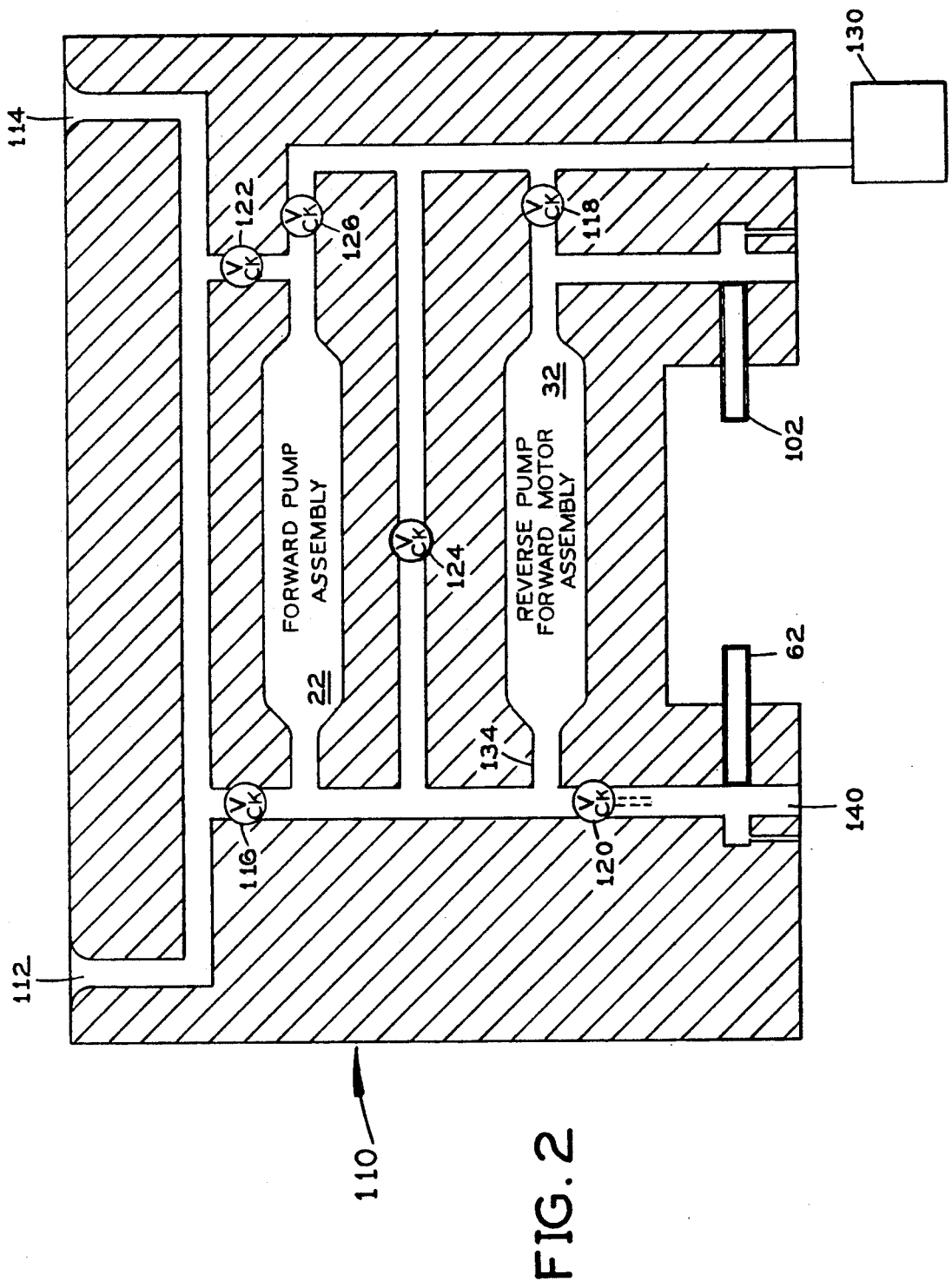

PUMP CONTROLLED AUTOMATIC TRANSMISSION

FILING HISTORY

The content of this patent application is based upon the content of Disclosure Document Number 281005.

BACKGROUND OF THE INVENTION

1. Field of the Invention:

The present invention relates generally to the field of automatic transmissions, and more specifically to a transmission wherein an input shaft is connected to planet gears surrounding a sun gear, the sun gear is connected to a pump and an output shaft is connected to a ring gear, such that gradually restricting the flow of fluid from the pump slows movement of the sun gear and thereby causes the planet gears to progressively transmit more of their torque to the ring gear, and thus to the output shaft.

2. Description of the Prior Art:

There are several transmissions in the prior art employing planetary gear arrangements. All have fundamental disadvantages such as reliance on clutches, an absence of reverse, park or overdrive modes, or substantial complexity.

DeLalio, U.S. Pat. No. 3,969,957, issued on July 20, 1976, discloses a vehicle transmission having reverse, low forward and high forward speed planetary gear sets, and a planetary clutch. Problems with DeLalio include disadvantages stemming from the use of a clutch, such as a jolt when shifting, heat and wasted power, and the need for relatively frequent clutch adjustment. Also, the pump assembly can be replaced only by removing the entire transmission from the vehicle. Finally, no overdrive mode is provided.

Schauer, U.S. Pat. No. 3,796,111, issued on Mar. 12, 1974, teaches a hydromechanical transmission combining torque from both mechanical and hydraulic paths. Clutches are engaged to enter low and high speed ranges. The disadvantages of a clutch are compounded for this invention, since more than one clutch is provided. No less important is that no provision is made for reverse operation or for locking into park.

Reed, U.S. Pat. No. 4,164,156, issued on Aug. 14, 1979, is directed to a multi-range concentric gear train requiring gear shifting. It includes a several planetary gear sets which are concentric about a common centerline to provide four speed ranges. Reed has the multiplied disadvantages of four clutches as well as substantial complexity and expense. And, once again, one must remove the transmission from the vehicle to replace the pump assembly.

A second patent, U.S. Pat. No. 4,183,264, issued to Reed on Jan. 15, 1980. This patent discloses an improvement to the multi-range transmission in the form of an overrunning clutch to preclude the undesired backward motion of an element under critical load conditions. This Reed design once again requires shifting and the use of multiple clutches. No reverse or overdrive operation is provided.

Mizuno, U.S. Pat. No. 4,368,653, issued on Jan. 18, 1983, teaches another variation of the hydromechanical transmission. Speed ratio detecting means are provided to detect lower and higher limits of a predetermined speed ratio, together with clutch control means. Again, there are the disadvantages of multiple clutches, combined with high complexity and no park mode.

Kita, U.S. Pat. No. 4,776,233, issued on Oct. 11, 1988, discloses a transmission having low and high speed modes and clutches for shifting from one to the other. Once again, there are the disadvantages of using a clutch, including a lurch during shifting, even if minimized, the generation of heat and the need for relatively frequent adjustment.

Finally, there is Koyama, U.S. Pat. No. 4,941,371, issued on July 17, 1990. Koyama teaches a hydraulic transmission with a clutch valve to reduce the jolt experienced in engaging its clutch. Thus Koyama has the disadvantages of a clutch, and also provides no reverse, overdrive or park modes.

It is thus an object of the present invention to provide a transmission which provides a continuously variable ratio of input to output angular speed without the use of a clutch or the need to otherwise change gears while moving in a forward or a reverse direction.

It is another object of the present invention to provide such a transmission which includes overdrive, reverse, and park modes.

It is another object of the present invention to eliminate the need for a clutch or torque converter to disengage the drive motor from the transmission, as required for present automotive transmissions.

It is still another object of the present invention to provide such a transmission which permits access to pump means for servicing or replacement without the need to remove the transmission from the vehicle.

It is finally an object of the present invention to provide such a transmission which is simple in design, reliable, and inexpensive.

SUMMARY OF THE INVENTION

The present invention accomplishes the above-stated objectives, as well as others, as may be determined by a fair reading and interpretation of the entire specification.

A hydromechanical transmission is provided, including a first shaft having a drive source end and a transmission end which receives torque from a drive source, a planet gear mounting structure joined to the transmission end of the first shaft, at least one planet gear rotatably mounted on the planet gear mounting structure, a ring gear surrounding and meshing with the at least one planet gear and joined by a connecting structure to a second shaft to which the transmission delivers torque, an annular sun gear slidably surrounding the transmission end of the first shaft and meshing with the at least one planet gear, a first pump having a pump operating shaft, the pump operating shaft being joined to the sun gear through gears, fluid to pump through the first pump, a valve for controlling the flow of fluid out of the first pump. A mechanism for variably applying torque to the second shaft in the reverse direction includes a second annular sun gear slidably surrounding the second shaft, a connecting structure joining the planet gear mounting structure with the second sun gear, at least one second planet gear adjacent to and meshing with the second sun gear, a second fluid pump having a second pump operating shaft, the pump operating shaft being joined to the at least one second planet gear with gears, a valve for controlling the flow of fluid out of the second pump, a second ring gear surrounding and meshing with the at least one second planet gear and joined to the second shaft with a connecting structure.

The first and second pumps are preferably located adjacent to each other so that they are jointly accessible for servicing. The operating shafts of the first and second pumps are preferably coaxial, one in the form of a tube and the other in the form of a shaft slidably contained within the tube permitting independent rotation. The connecting structures between the sun gear and the first pump, and the at least one planet gear and the second pump operating shafts preferably include two meshing bevel gears. A housing is provided for containing the transmission and the fluid, and preferably includes a removable pan located to provide access to the pumps. To create a parking mode, a locking member and detents on the outer surface of the second ring gear for receiving portion of the locking member are provided. A manifold for carrying fluid to and from the first and second pumps is preferably provided, including channels for simultaneously delivering fluid to the first and second pumps such that when the first pump fluid flow is restricted, the second pump is driven as a motor to deliver added torque to the output shaft. A mechanical means may be provided to select mode of operation -park, neutral, forward, reverse . A mechanical, electronic, or hydraulic means may be provided to operate the two control valves for speed control in the forward or reverse modes.

BRIEF DESCRIPTION OF THE DRAWINGS

Various other objects, advantages, and features of the invention will become apparent to those skilled in the art from the following discussion taken in conjunction with the following drawings, in which:

2. FIG. 2 is a schematic view of the inventive pump manifold revealing the preferred paths of fluid flow to and from the pumps.

DETAILED DESCRIPTION OF THE PREFERRED EMBODIMENTS

Figure 1:
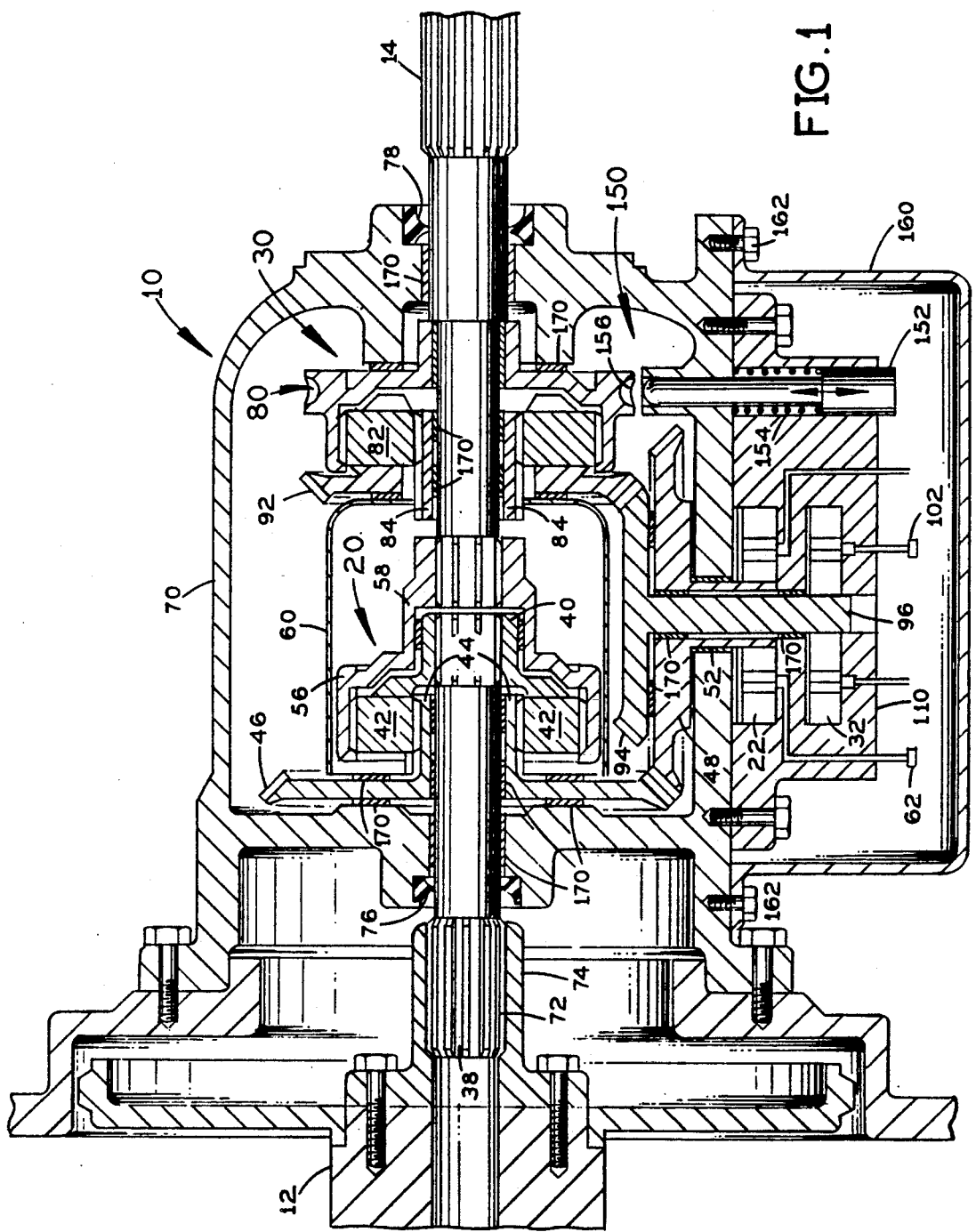
FIG. 1 is a cross-sectional side view of the preferred embodiment of the inventive transmission, shown bolted to a drive source.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Referring to FIG. 1, a transmission 10 is disclosed wherein forward torque is transferred from a crank shaft 12 to a drive shaft 14 through a first orbit gear assembly 20 connected to a first pump 22. As revealed in detail below, transmission 10 is constructed in such a way that free passage of fluid through first pump 22 permits crank shaft 12 to spin freely and transfer no torque to drive shaft 14. Gradually restricting the flow of fluid out of first pump 22 has the effect of gradually transferring torque through orbit gear assembly 20 to drive shaft 14. In this way, the angular velocity of drive shaft 14 is increased or decreased without the use of a clutch or the changing of gears. A second orbit gear assembly 30 and a second pump 32 permit reversal of the angular velocity of drive shaft 14 and progressive changing of the magnitude of the velocity.

Crank shaft 12 extends from a drive source such as an internal combustion engine and joins a crank linkage shaft 38 which is part of transmission 10. Crank linkage shaft 38 joins a spoke frame 40 fitted with a plurality of planet gears 42 within orbit gear assembly 20. Planet gears 42 surround and mesh with a first annular sun gear 44 which slidingly surrounds crank linkage shaft 38. The end of first sun gear 44 adjacent the drive source expands to form a first bevel gear 46, which meshes with a second bevel gear 48. Second bevel gear 48 is axially joined to the axle 52 of first pump 22.

A ring gear 56 of orbit gear assembly 20 is joined to drive shaft 14 by a connecting hub 58. Drive shaft 14 is axially aligned with but separated from crank linkage shaft 38. A first valve mechanism 62, which can be remotely operated through linkages, controls the flow of fluid exiting first pump 22. Gradually restricting the flow of fluid from pump 22 with valve mechanism 62 slows pump 22 and thus slows the rotation of pump axle 52. Slowing the rotation of pump axle 52 in turn slows the rotation of bevel gears 46 and 48, thereby slowing the rotation of first sun gear 44. Slowing the rotation of sun gear 44 causes planet gears 42 to progressively transmit more of their rotational motion to ring gear 56, and thus to drive shaft 14. This progressive increase, or alternatively the progressive decrease, of the angular velocity of drive shaft 14 eliminates the need for a changing of gears to effect changes in speed. The interaction of orbit gear assembly 20 and first pump 22 transmits torque to drive shaft 14 from neutral to overdrive levels with a continuously variable crank shaft 12 to drive shaft 14 ratio. It is possible to maintain a constant, maximum torque throughout the full range of operation.

Transmission 10 is enclosed by a fluid tight case 70. An adaptor interface 72 and crank linkage shaft 38 link crank shaft 12 with transmission 10. See FIG. 1. The end of crank linkage shaft 38 protruding from transmission 10 is splined and is pressed into a collar portion 74 of adaptor interface 72. A first seal 76 is provided around crank shaft 12 where it exits case 70 and a second seal 78 is provided where drive shaft 14 exits case 70 to prevent the escape of fluid. Seals 76 and 78 each taper to make only line contact with their respective shafts 12 and 14.

The mechanism for turning drive shaft 14 in reverse is made up of elements similar to those for forward motion. Drive shaft 14 is joined to a second ring gear 80 containing a plurality of second planet gears 82 within second orbit gear assembly 30. Planet gears 82 surround and mesh with a second annular sun gear 84 which slidingly surrounds drive shaft 14. Sun gear 84 will always rotate at the same speed as crank linkage shaft 38, by way of drive drum 60, and spoke frame 40. Second planet gears 82 are rotatably joined to a third bevel gear 92, which meshes with a fourth bevel gear 94. Fourth bevel gear 94 is axially joined to the axle 96 of second pump 32 which is slidably contained within axle 52 of first pump 22.

A second valve mechanism 102, which can be remotely operated through linkages, controls the flow of fluid exiting second pump 32. Gradually restricting the flow of fluid from second pump 32 with second valve mechanism 102 slows second pump 32 and thus slows the rotation of second pump axle 96. Slowing the rotation of second pump axle 96 in turn slows the rotation of bevel gears 92 and 94, thereby slowing the rotation of second planet gears 82. Slowing the rotation of second planet gears 82 causes second sun gear 84 to progressively transmit more of its rotational motion to a second ring gear 80, and thus to drive shaft 14. Where a reverse mechanism is provided, pumps 22 and 32 must both be unrestricted to place transmission 10 in neutral or park.

Transmission 10 receives lubrication fluid from pump 22 and pump 32, separately or in combination. The fluid lines supplying pumps 22 and 32 are illustrated in FIG. 2, and are contained in a manifold 110. Fluid lubricating the forward section of transmission 10 exits manifold 110 at port 112. Fluid lubricating the rear section of transmission 10 exits manifold 110 at port 114. The lubricating fluid flows from pump 22 through one way check valve 116 when in the forward, neutral, or park mode. Lubricating fluid flows from pump 22 through one way check valve 122 when transmission 10 is in the forward mode and a negative torque (such as during deceleration) is encountered. Note that pump 22 will turn in the opposite direction during vehicle deceleration. A spring-loaded release valve 120 ensures a minimum lubricating pressure, preferably 40 pounds per square inch, to transmission 10 when valve 62 is fully open as in neutral, park, or reverse modes. One way check valve 126 is provided to prevent fluid flow from pump 22 backward through inlet filter 130. One way check valve 118 is provided to ensure fluid flow from inlet filter 130 during deceleration in the reverse mode. One way check valve 124 is provided to insure inlet flow to pump 22 during deceleration in the forward mode.

Check valve 122 provides lubrication for deceleration. Check valves 118 and 124 inlet fluid to pumps 22 and 32 for deceleration. Check valve 126 prevents pump 22 discharge from back flow to filter 130 during deceleration. Spring-loaded release valve 120 ensures minimum lubricant pressure to transmission 10 during neutral, park and reverse modes. Check valve 116 prevents back flow during deceleration.

When drive shaft 14 is at neutral with the engine running, valve mechanism 62 is fully open, and fluid from first pump 22 is free to flow out of port 140. Closing valve mechanism 62 increases pressure from first pump 22. Increased pressure from first pump 22 will be present at port 134 to drive second pump 32 as a hydraulic motor, to drive second orbit gear assembly 30 and apply torque to second ring gear 80 to recover high pressure fluid energy which would otherwise be lost. Second sun gear 84 is joined to spoke frame 40 through a drive drum 60 so that pumps 22 and 32 can function cooperatively. The operation of valve mechanisms 62 and 102 may be computer controlled and may be tied to torque and speed measuring devices.

A parking brake lock 150 is provided in the form of a lock shaft 152 which is biased with a spring 154 to slide into any one of a plurality of detents 156 on the outer surface of second ring gear 80. Lock shaft 152 is preferably operated remotely through linkages.

The bottom of case 70 is fitted with a removable fluid pan 160 to permit access to pumps 22 and 32, which are positioned below the other parts of transmission 10. See FIG. 1. Fluid pan 160 is secured to case 70 with pan bolts 162. As indicated generally above, the fluid contained by case 70 serves a dual purpose. First, it flows through and permits the control of the speed of pumps 22 and 32, in turn controlling drive shaft 14 speed. Second, and no less important, it lubricates the moving parts of transmission 10. To further reduce frictional resistance to the relative movement of parts, bushings or bearings 170 are provided therebetween.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A hydromechanical transmission, comprising:
   a first shaft having a drive source end and a transmission end which receives torque from a drive source,
   a planet gear mounting structure joined to said transmission end of said first shaft,
   at least one planet gear rotatably mounted on said planet gear mounting structure,
   a ring gear surrounding and meshing with said at least one planet gear and joined by connecting means to a second shaft to which the transmission delivers torque,
   an annular sun gear slidably surrounding said transmission end of said first shaft and meshing with said at least one planet gear,
   first pump means having a pump operating shaft, said pump operating shaft being joined to said sun gear through gear means,
   fluid to pump through said first pump means;
   valve means for controlling the rate of flow of said fluid out of said first pump means.

2. A hydromechanical transmission as in claim 1, additionally comprising:
   a second annular sun gear slidably surrounding said second shaft,
   connecting means joining said planet gear mounting structure with said second sun gear,
   at least one second planet gear adjacent to and meshing with said second sun gear,
   second fluid pump means having a second pump operating shaft, said pump operating shaft being joined to said at least one second planet gear with gear means,
   valve means for controlling the rate of flow of said fluid out of said second pump means,
   a second ring gear surrounding and meshing with said at least one second planet gear and joined to said second shaft with connecting means.

3. A hydromechanical transmission as in claim 2, wherein said first and second pump means are located adjacent to each other such that they are jointly accessible for servicing.

4. A hydromechanical transmission as in claim 3, wherein the operating shafts of said first and second pump means are coaxial, one in the form of a tube and the other in the form of a shaft slidably contained within the tube permitting independent rotation.

5. A hydromechanical transmission as in claim 1, wherein the connecting means between said sun gear and said pump operating shaft comprises two meshing bevel gears.

6. A hydromechanical transmission as in claim 2, wherein the connecting means between said at least one second planet gear and said second pump operating shaft comprises two meshing bevel gears.

7. A hydromechanical transmission as in claim 1, additionally comprising a housing for containing said transmission and said fluid.

8. A hydromechanical transmission as in claim 7, wherein said housing comprises a removable pan located to provide access to said pump means.

9. A hydromechanical transmission as in claim 2, wherein said second ring gear has an outer surface, additionally comprising parking brake means comprising:
   a locking member,
   detents on the outer surface of said second ring gear for receiving a portion of said locking member.

10. A hydromechanical transmission as in claim 9, wherein said parking brake means additionally comprises biasing means for biasing said locking member away from said outer surface of said second ring gear.

11. A hydromechanical transmission as in claim 2, comprising manifold means for carrying said fluid to and from said first and second pump means, comprising:
   channel means for simultaneously delivering fluid to said first and second pump means such that when said first pump means is operated, said second pump means is driven as a motor to deliver torque to said second shaft.

12. A hydromechanical transmission as in claim 1, additionally comprising:
   adaptor means for joining said first shaft to the crank shaft of an internal combustion engine.

13. A hydromechanical transmission, comprising:
   a first shaft having a drive source end and a transmission and which receives torque from a drive source,
   a planet gear mounting structure joined to said transmission end of said first shaft,
   at least one planet gear rotatably mounted on said planet gear mounting structure,
   a ring gear surrounding and meshing with said at least one planet gear and joined by connecting means to a second shaft to which the transmission delivers torque,
   an annular sun gear slidably surrounding said transmission end of said first shaft and meshing with said at least one planet gear,
   first pump means having a pump operating shaft, said pump operating shaft being joined to said sun gear through gear means,
   fluid to pump through said first pump means,
   means for controlling the flow of said fluid out of said first pump means,
   a second annular sun gear slidably surrounding said second shaft,
   connecting means joining said planet gear mounting structure with said second sun gear,
   at least one second planet gear adjacent to and meshing with said second sun gear,
   second fluid pump means having a second pump operating shaft, said pump operating shaft being joined to said at least one second planet gear with gear means,
   means for controlling the flow of said fluid out of said second pump means,
   a second ring gear surrounding and meshing with said at least one second planet gear and joined to said second shaft with connecting means, wherein said second ring gear has an outer surface,
   parking brake means comprising a locking member and detents on the outer surface of said second ring gear for receiving a portion of said locking member.

14. A hydromechanical transmission, comprising:
   a first shaft having a drive source end and a transmission end which receives torque from a drive source,
   a planet gear mounting structure joined to said transmission end of said first shaft,
   at least one planet gear rotatably mounted on said planet gear mounting structure,
   a ring gear surrounding and meshing with said at least one planet gear and joined by connecting means to a second shaft to which the transmission delivers torque,
   an annular sun gear slidably surrounding said transmission end of said first shaft and meshing with said at least one planet gear,
   first pump means having a pump operating shaft, said pump operating shaft being joined to said sun gear through gear means,
   fluid to pump through said first pump means,
   means for controlling the flow of said fluid out of said first pump means,
   a second annular sun gear slidably surrounding said second shaft,
   connecting means joining said planet gear mounting structure with said second sun gear,
   at least one second planet gear adjacent to and meshing with said second sun gear,
   second fluid pump means having a second pump operating shaft, said pump operating shaft being joined to said at least one second planet gear with gear means,
   means for controlling the flow of said fluid out of said second pump means,
   a second ring gear surrounding and meshing with said at least one second planet gear and joined to said second shaft with connecting means, wherein said second ring gear has an outer surface,
   parking brake means comprising a locking member, detents on the outer surface of said second ring gear for receiving a portion of said locking member, and biasing means for biasing said locking member away from said outer surface of said second ring gear.

* * * * *